(12) United States Patent  
Gaynes et al.

(10) Patent No.: US 11,717,055 B2  
(45) Date of Patent: Aug. 8, 2023

(54) AUTOMATED FOOTWEAR LACING SYSTEMS, DEVICES, AND TECHNIQUES

(71) Applicant: NIKE, Inc., Beaverton, OR (US)

(72) Inventors: Steve Gaynes, Beaverton, OR (US); David Mellinger, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 1412 days.

(21) Appl. No.: 15/993,905

(22) Filed: May 31, 2018

(65) Prior Publication Data

US 2018/0368527 A1 Dec. 27, 2018

Related U.S. Application Data

(60) Provisional application No. 62/513,213, filed on May 31, 2017.

(51) Int. Cl.
*A43C 11/16* (2006.01)
*A43C 1/00* (2006.01)
(Continued)

(52) U.S. Cl.
CPC ............ *A43C 11/165* (2013.01); *A43B 3/34* (2022.01); *A43C 1/00* (2013.01); *A43C 7/08* (2013.01); *B65H 59/00* (2013.01); *B65H 69/00* (2013.01); *B65H 75/368* (2013.01); *B65H 75/4428* (2013.01); *B65H 75/4484* (2013.01);
(Continued)

(58) Field of Classification Search
CPC ............ B65H 2403/46; B65H 75/368; Y10T 24/3724; F16G 11/00; F16G 11/06; F16G 11/12; F16G 11/14; A43C 11/16; A43C 1/00; A43B 3/34
See application file for complete search history.

(56) References Cited

U.S. PATENT DOCUMENTS 5,152,038 A 10/1992 Schoch
5,600,874 A 2/1997 Jungkind
(Continued)

FOREIGN PATENT DOCUMENTS

CA 2998546 A1 4/2017
CN 1096572 A 12/1994
(Continued)

OTHER PUBLICATIONS

"International Application Serial No. PCT US2018 035287, International Preliminary Report on Patentability dated Dec. 12, 2019", 6 pgs.
(Continued)

*Primary Examiner* — Robert Sandy
(74) *Attorney, Agent, or Firm* — Schwegman, Lundberg & Woessner, P.A.

(57) ABSTRACT

Lacing engine systems, apparatus, and methods of operation are discussed. In an example, a lacing engine apparatus can include a housing, a drivetrain, and a lace take-up mechanism for retracting a length of lace cable upon activation. The drivetrain can include various reduction gears to reduce rotational speed out of the motor and power the lace take-up mechanism. The lace take-up mechanism can include structures such as a double-yoke, a radial pulley including an outer rotating disc and an inner stationary disc, a variable take-up spool, or a zip-strip mechanism.

16 Claims, 12 Drawing Sheets

(51) Int. Cl.

| | | |
|---|---|---|
| *A43B 3/34* | (2022.01) | |
| *B65H 59/00* | (2006.01) | |
| *B65H 69/00* | (2006.01) | |
| *F16H 1/28* | (2006.01) | |
| *A43C 7/08* | (2006.01) | |
| *B65H 75/44* | (2006.01) | |
| *B65H 75/36* | (2006.01) | |
| *F16G 11/00* | (2006.01) | |
| *F16G 11/10* | (2006.01) | |
| *F16G 11/12* | (2006.01) | |
| *F16G 11/14* | (2006.01) | |

(52) U.S. Cl.
CPC ........... *F16G 11/00* (2013.01); *F16H 1/2863* (2013.01); *B65H 2403/46* (2013.01); *B65H 2511/411* (2013.01); *B65H 2515/31* (2013.01); *B65H 2553/20* (2013.01); *B65H 2701/39* (2013.01); *F16G 11/106* (2013.01); *F16G 11/12* (2013.01); *F16G 11/14* (2013.01); *Y10T 24/34* (2015.01); *Y10T 24/3724* (2015.01)

(56) References Cited

U.S. PATENT DOCUMENTS

| | | |
|---|---|---|
| 7,721,468 B1 | 5/2010 | Johnson et al. |
| 2003/0150135 A1 | 8/2003 | Liu |
| 2003/0204938 A1 | 11/2003 | Hammerslag |
| 2006/0156584 A1 | 7/2006 | Johnson |
| 2008/0066346 A1 | 3/2008 | Hammerslag et al. |
| 2008/0301919 A1 | 12/2008 | Ussher |
| 2008/0307673 A1 | 12/2008 | Johnson |
| 2010/0139057 A1 | 6/2010 | Soderberg et al. |
| 2010/0299959 A1 | 12/2010 | Hammerslag et al. |
| 2011/0266384 A1 | 11/2011 | Goodman et al. |
| 2011/0303782 A1 | 12/2011 | Hu et al. |
| 2014/0068838 A1 | 3/2014 | Beers et al. |
| 2014/0082933 A1 | 3/2014 | Beers |
| 2015/0089835 A1 | 4/2015 | Hammerslag et al. |
| 2015/0230560 A1 | 8/2015 | Chen |
| 2015/0250268 A1 | 9/2015 | Alt et al. |
| 2017/0055626 A1 | 3/2017 | Rushbrook |
| 2018/0125168 A1* | 5/2018 | Beers ................. A43C 11/165 |

FOREIGN PATENT DOCUMENTS

| | | |
|---|---|---|
| CN | 2613167 Y | 4/2004 |
| CN | 1618363 A | 5/2005 |
| CN | 1758862 A | 4/2006 |
| CN | 101193568 A | 6/2008 |
| CN | 101784210 A | 7/2010 |
| CN | 102132983 A | 7/2011 |
| CN | 103153112 A | 6/2013 |
| CN | 103476288 A | 12/2013 |
| CN | 104585975 A | 5/2015 |
| CN | 104839942 A | 8/2015 |
| CN | 105581438 A | 5/2016 |
| CN | 105722419 A | 6/2016 |
| CN | 111315249 B | 6/2020 |
| CN | 111615344 A | 9/2020 |
| CN | 111629625 A | 9/2020 |
| CN | 113662314 A | 11/2021 |
| CN | 111629625 A | 12/2021 |
| CN | 111615344 A | 4/2022 |
| CN | 114304812 A | 4/2022 |
| CN | 111315249 A | 7/2022 |
| CN | 115104810 A | 9/2022 |
| EP | 3629820 B1 | 4/2020 |
| EP | 3629821 A2 | 4/2020 |
| EP | 3629820 B1 | 8/2022 |
| FR | 3038815 A1 | 1/2017 |
| JP | 3165581 U | 1/2011 |
| JP | 2016039921 A | 3/2016 |
| KR | 20150131485 A | 11/2015 |
| TW | 201429420 A | 8/2014 |
| WO | 2010059989 A2 | 5/2010 |
| WO | 2015042216 A1 | 3/2015 |
| WO | 2015054722 A1 | 4/2015 |
| WO | 2016195957 A1 | 12/2016 |
| WO | WO-2016191123 A1 | 12/2016 |
| WO | 2018222805 A2 | 12/2018 |
| WO | 2018222807 A2 | 12/2018 |
| WO | 2018222836 A2 | 12/2018 |
| WO | 2018222805 A3 | 1/2019 |

OTHER PUBLICATIONS

"International Application Serial No. PCT US2018 035289, International Preliminary Report on Patentability dated Dec. 12, 2019", 8 pgs.

"International Application Serial No. PCT US2018 035341, International Preliminary Report on Patentability dated Dec. 12, 2019", 12 pgs.

"European Application Serial No. 18810542.3, Extended European Search Report dated Feb. 1, 2021", 7 pgs.

"European Application Serial No. 18809615.0, Response Filed Feb. 23, 2022 to Extended European Search Report dated Jul. 27, 2021", 26 pgs.

"Chinese Application Serial No. 202110936034.1, Voluntary Amendment filed Mar. 10, 2022", With English claims, 10 pgs.

"Chinese Application Serial No. 201880048175.6, Response filed Apr. 1, 2022 to Office Action dated Sep. 16, 2021", w English claims, 34 pgs.

"Chinese Application Serial No. 201880048164.8, Response Filed Aug. 12, 2021 to Office Action dated Apr. 12, 2021", With English claims, 10 pages.

"Chinese Application Serial No. 201880048164.8, Response filed Sep. 9, 2021 to Examiner Telephone Interview", w English claims, 8 pgs.

"European Application Serial No. 18810542.3, Response filed Aug. 18, 2021 to Extended European Search Report dated Feb. 1, 2021", 32 pgs.

"Chinese Application Serial No. 201880048319.8, Response filed Sep. 22, 2021 to Office Action dated May 7, 2021", w English claims, 45 pgs.

"Chinese Application Serial No. 201880048175.6, Office Action dated Sep. 16, 2021", With English translation, 10 pgs.

"European Application Serial No. 22184045.7, Response filed Sep. 29, 2022 to Invitation to Remedy Deficiencies (R. 58 EPC) mailed", 7 pgs.

"European Application Serial No. 22184045.7, Extended European Search Report dated Dec. 6, 2022", 7 pgs.

"International Application Serial No. PCT/US2018/035287, International Search Report dated Nov. 30, 2018", 4 pgs.

"International Application Serial No. PCT/US2018/035287, Written Opinion dated Nov. 30, 2018", 4 pgs.

"International Application Serial No. PCT/US2018/035341, International Search Report dated Nov. 30, 2018", 5 pgs.

"International Application Serial No. PCT/US2018/035341, Written Opinion dated Nov. 30, 2018", 10 pgs.

"Chinese Application Serial No. 202110936034.1, Response filed Feb. 13, 2023 to Office Action dated Jul. 29, 2022", w/ English claims, 10 pgs.

"Chinese Application Serial No. 202210367249.0, Notification to Make Rectification dated Jun. 23, 2022", With English translation, 3 pgs.

"Chinese Application Serial No. 202110936034.1, Office Action dated Jul. 29, 2022", w English translation, 11 pgs.

"Chinese Application Serial No. 202210367249.0, Response filed Aug. 23, 2022 to Notification to Make Rectification dated Jun. 23, 2022", w English Claims, 24 pgs.

"European Application Serial No. 18810465.7, Extended European Search Report dated Apr. 9, 2021", 7 pgs.

"European Application Serial No. 18809615.0, Communication pursuant to Rule 164(1) EPC dated Apr. 16, 2021", 13 pgs.

"Chinese Application Serial No. 201880048164.8, Office Action dated Apr. 12, 2021", w English translation, 13 pgs.

(56) References Cited

OTHER PUBLICATIONS

"Chinese Application Serial No. 201880048319.8, Office Action dated May 7, 2021", w English translation, 23 pgs.
"European Application Serial No. 18809615.0, Extended European Search Report dated Jul. 27, 2021", 12 pgs.
"Chinese Application Serial No. 201880048175.6, Response filed Aug. 16, 2021 to Notification to Make Divisional Application dated Mar. 31, 2021", w current English claims, 9 pgs.
"European Application Serial No. 18809615.0, Response to Communication Pursuant to Rules 161 and 162 filed Jun. 25, 2020", 11 pgs.
"European Application Serial No. 18810542.3, Response to Communication Pursuant to Rules 161 and 162 filed Jun. 25, 2020", 10 pgs.
"European Application Serial No. 18810465.7, Response to Communication pursuant to Rules 161 and 162 filed Jun. 25, 2020", 12 pgs.
"International Application Serial No. PCT US2018 035289, Written Opinion dated Jan. 2, 2019", 6 pgs.
"International Application Serial No. PCT US2018 035289, International Search Report dated Jan. 2, 2019", 5 pgs.
"European Application Serial No. 18810465.7, Response filed Nov. 8, 2021 to Extended European Search Report dated Apr. 9, 2021", 44 pgs.

\* cited by examiner

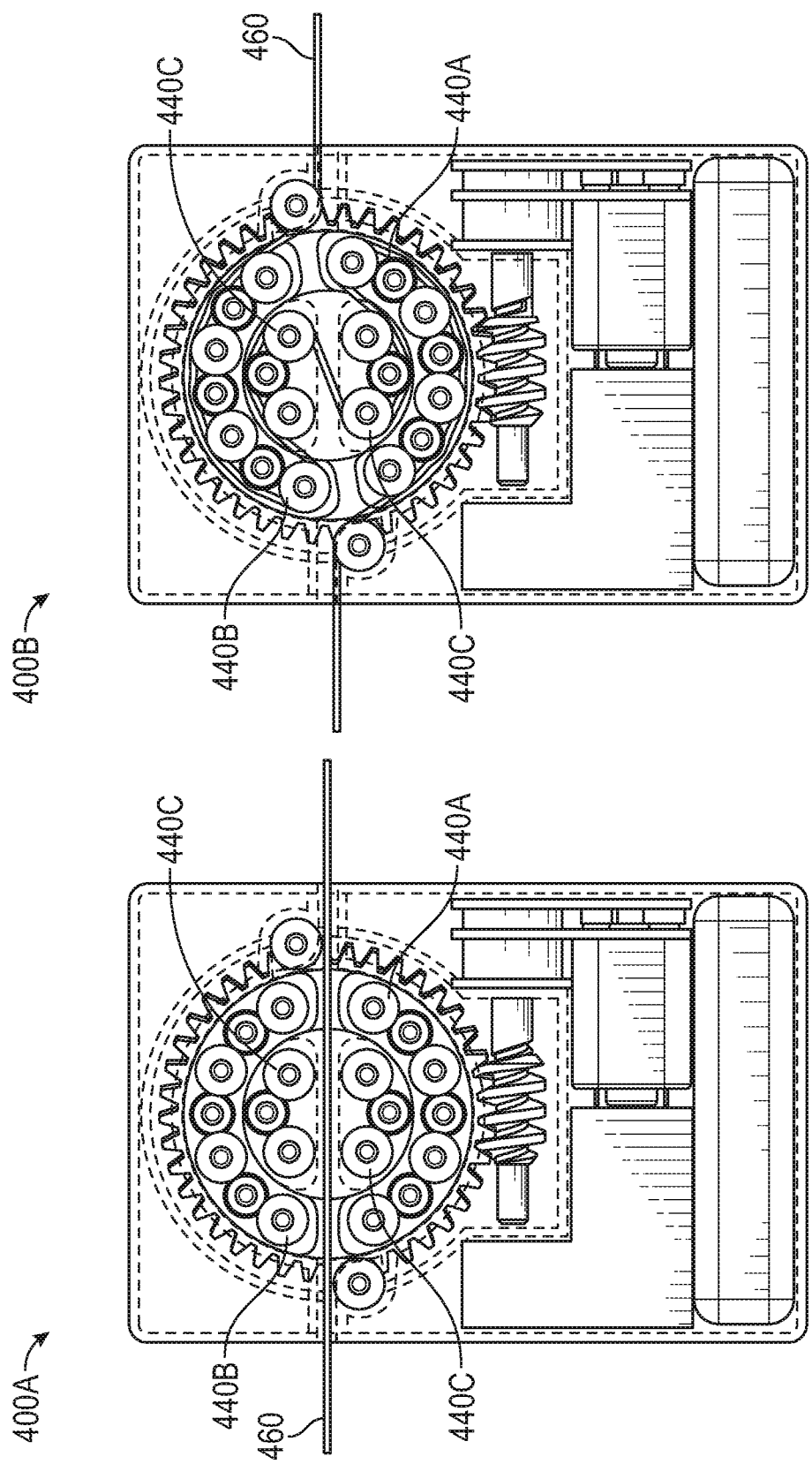

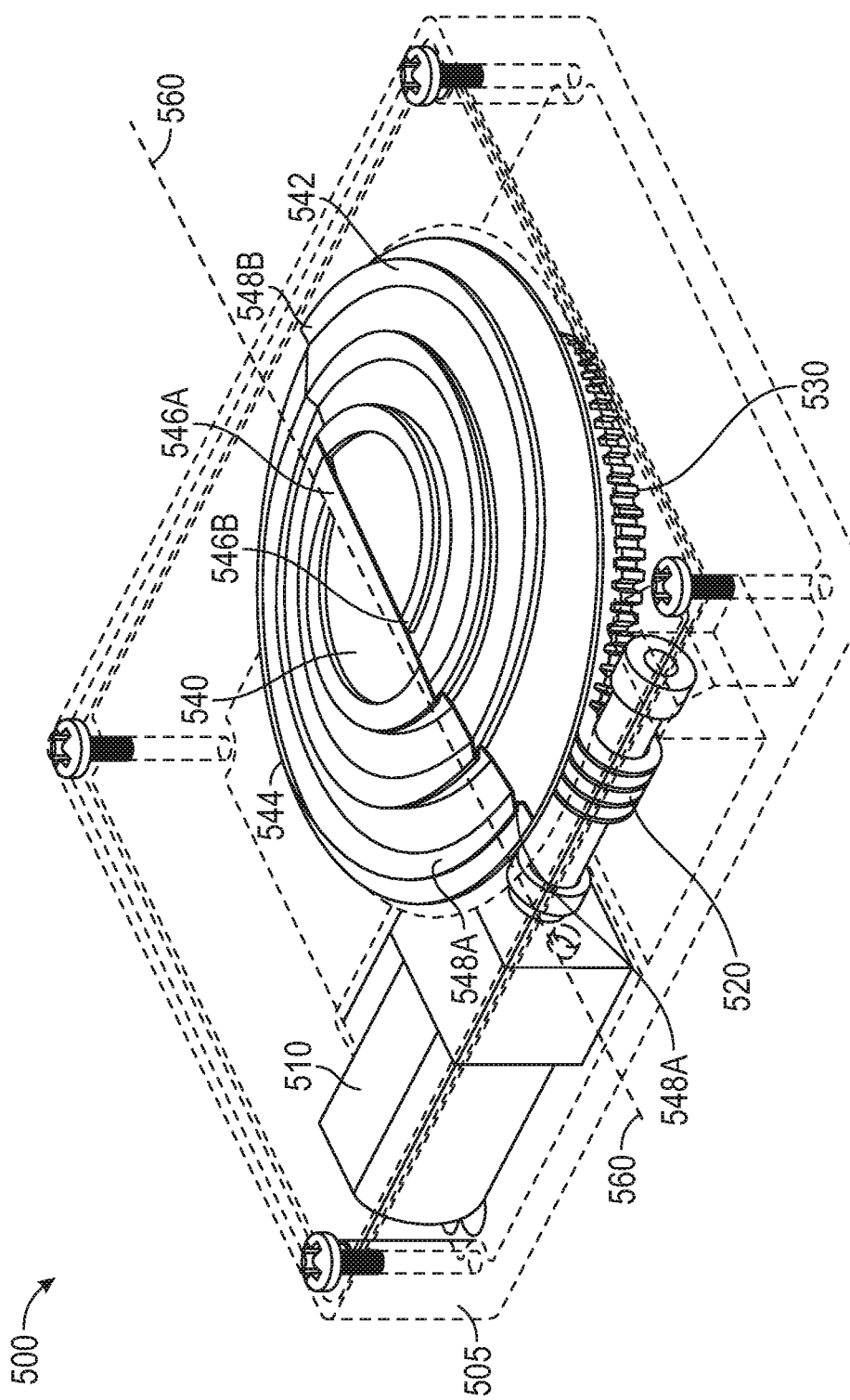

AUTOMATED FOOTWEAR LACING SYSTEMS, DEVICES, AND TECHNIQUES

PRIORITY APPLICATIONS

This application claims the benefit of priority to U.S. Provisional Patent Application Ser. No. 62/513,213, filed May 31, 2017, the content of which is incorporated by reference herein in its entirety.

FIELD OF THE INVENTION

The following specification describes various aspects of a footwear assembly involving a lacing system including a motorized or non-motorized lacing engine, footwear components related to the lacing engines, automated lacing footwear platforms, and related concepts. More specifically, much of the following specification describes various aspects of lacing engine architectures (configurations) for use in footwear including motorized or non-motorized automated lace tightening.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A-4D are various illustrations of a radial pulley based lacing engine, according to some example embodiments.

FIGS. 5A-5B are various illustrations of a variable spool based lacing engine, according to some example embodiments.

Figure 1:
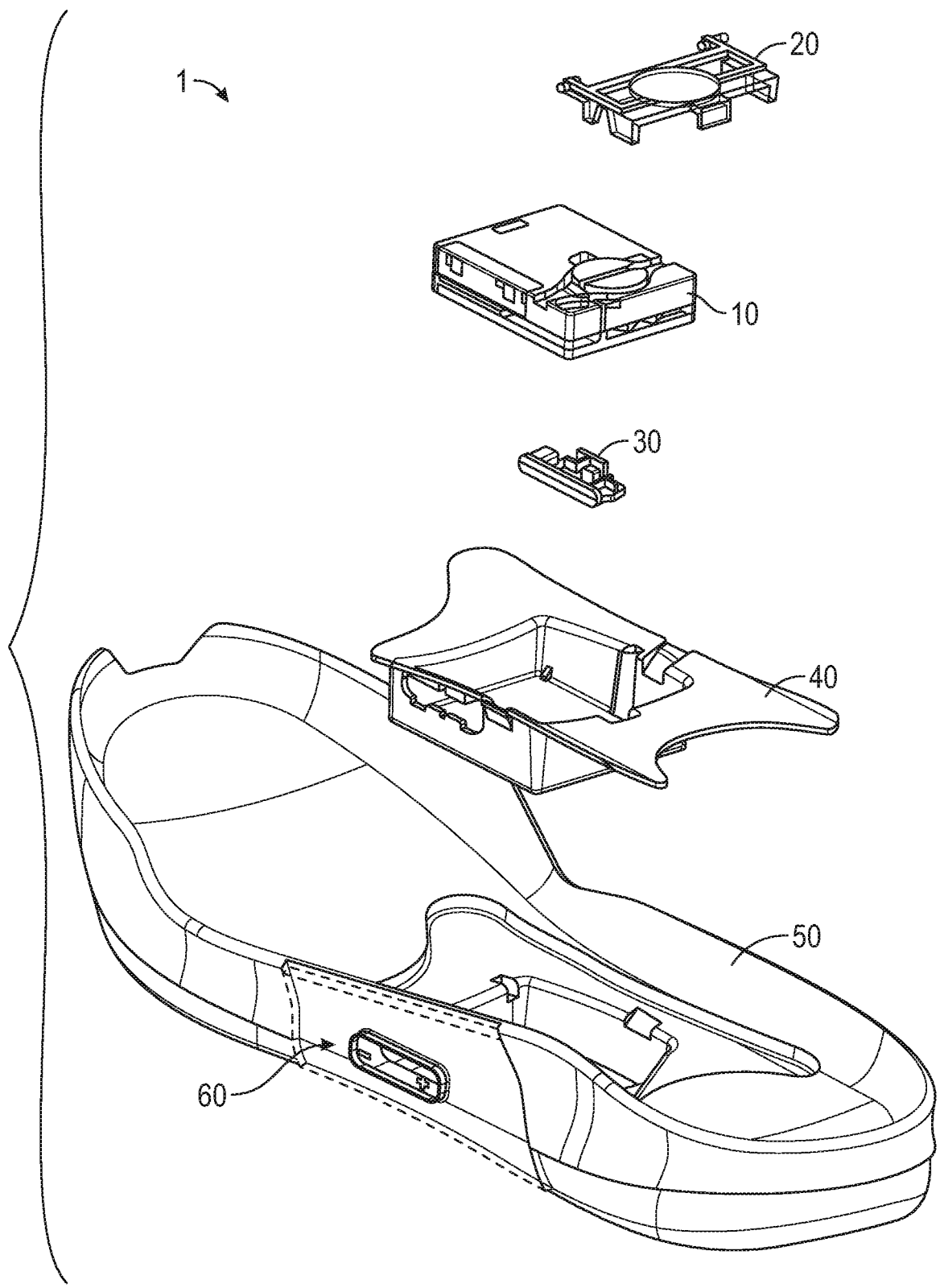
FIG. 1 is an exploded view illustration of components of a portion of a footwear assembly with a motorized lacing system, according to some example embodiments.

Any headings provided herein are merely for convenience and do not necessarily affect the scope or meaning of the terms used or discussion under the heading.

DETAILED DESCRIPTION

The concept of self-tightening shoe laces was first widely popularized by the fictitious power-laced Nike® sneakers worn by Marty McFly in the movie Back to the Future II, which was released back in 1989. While Nike® has since released at least one version of power-laced sneakers similar in appearance to the movie prop version from Back to the Future II, the internal mechanical systems and surrounding footwear platform employed did not necessarily provide a good mass production platform. Additionally, some other previous designs for motorized lacing systems comparatively suffered from problems such as high cost of manufacture, complexity, assembly challenges, and/or poor serviceability. The present inventors have developed various concepts to deliver a modular footwear platform to accommodate motorized and non-motorized lacing engines that solves some or all of the problems discussed above, among others. In order to fully leverage the modular lacing engine discussed briefly below and in greater detail in co-pending application Ser. No. 15/450,860, titled "LACING APPARATUS FOR AUTOMATED FOORWEAR PLATFORM," the present inventors developed various alternative and complementary lacing engine designs discussed herein.

The motorized lacing engine discussed below in reference to FIG. 1, as well as alternative concepts discussed throughout, was developed from the ground up to provide a robust, serviceable, and inter-changeable component of an automated lacing footwear platform. The lacing engine includes unique design elements that enable retail-level final assembly into a modular footwear platform. The lacing engine design allows for the majority of the footwear assembly process to leverage known assembly technologies, with unique adaptions to standard assembly processes still being able to leverage current assembly resources.

In an example, the modular automated lacing footwear platform includes a mid-sole plate secured to the mid-sole for receiving a lacing engine. The design of the mid-sole plate allows a lacing engine to be dropped into the footwear platform as late as at a point of purchase. The mid-sole plate, and other aspects of the modular automated footwear platform, allow for different types of lacing engines to be used interchangeably. For example, the motorized lacing engine discussed below could be changed out for a human-powered lacing engine. Alternatively, a fully automatic motorized lacing engine with foot presence sensing or other optional features could be accommodated within the standard mid-sole plate.

Utilizing motorized or non-motorized centralized lacing engines to tighten athletic footwear presents some challenges in providing sufficient performance without sacrificing some amount of comfort. Lacing architectures discussed herein have been designed specifically for use with centralized lacing engines, and are designed to enable various footwear designs from casual to high-performance.

This initial overview is intended to introduce the subject matter of the present patent application. It is not intended to provide an exclusive or exhaustive explanation of the various inventions disclosed in the following more detailed description.

Automated Footwear Platform

The following discusses various components of the automated footwear platform including a motorized lacing engine, a mid-sole plate, and various other components of the platform. While much of this disclosure focuses on lacing architectures for use with a motorized lacing engine, the discussed designs are applicable to a human-powered lacing engine or other motorized lacing engines with additional or fewer capabilities. Accordingly, the term "automated" as used in "automated footwear platform" is not intended to only cover a system that operates without user input. Rather, the term "automated footwear platform" includes various electrically powered and human-power, automatically activated and human activated mechanisms for tightening a lacing or retention system of the footwear.

FIG. 1 is an exploded view illustration of components of a motorized lacing system for footwear, according to some example embodiments. The motorized lacing system 1 illustrated in FIG. 1 includes a lacing engine 10, a lid 20, an actuator 30, a mid-sole plate 40, a mid-sole 50, and an outsole 60. FIG. 1 illustrates the basic assembly sequence of components of an automated lacing footwear platform. The motorized lacing system 1 starts with the mid-sole plate 40 being secured within the mid-sole. Next, the actuator 30 is inserted into an opening in the lateral side of the mid-sole plate opposite to interface buttons that can be embedded in the outsole 60. Next, the lacing engine 10 is dropped into the mid-sole plate 40. In an example, the lacing system 1 is inserted under a continuous loop of lacing cable and the lacing cable is aligned with a spool in the lacing engine 10 (discussed below). Finally, the lid 20 is inserted into grooves in the mid-sole plate 40, secured into a closed position, and latched into a recess in the mid-sole plate 40. The lid 20 can capture the lacing engine 10 and can assist in maintaining alignment of a lacing cable during operation.

In an example, the footwear article or the motorized lacing system 1 includes or is configured to interface with one or more sensors that can monitor or determine a foot presence characteristic. Based on information from one or more foot presence sensors, the footwear including the motorized lacing system 1 can be configured to perform various functions. For example, a foot presence sensor can be configured to provide binary information about whether a foot is present or not present in the footwear. If a binary signal from the foot presence sensor indicates that a foot is present, then the motorized lacing system 1 can be activated, such as to automatically tighten or relax (i.e., loosen) a footwear lacing cable. In an example, the footwear article includes a processor circuit that can receive or interpret signals from a foot presence sensor. The processor circuit can optionally be embedded in or with the lacing engine 10, such as in a sole of the footwear article.

Figure 2A:
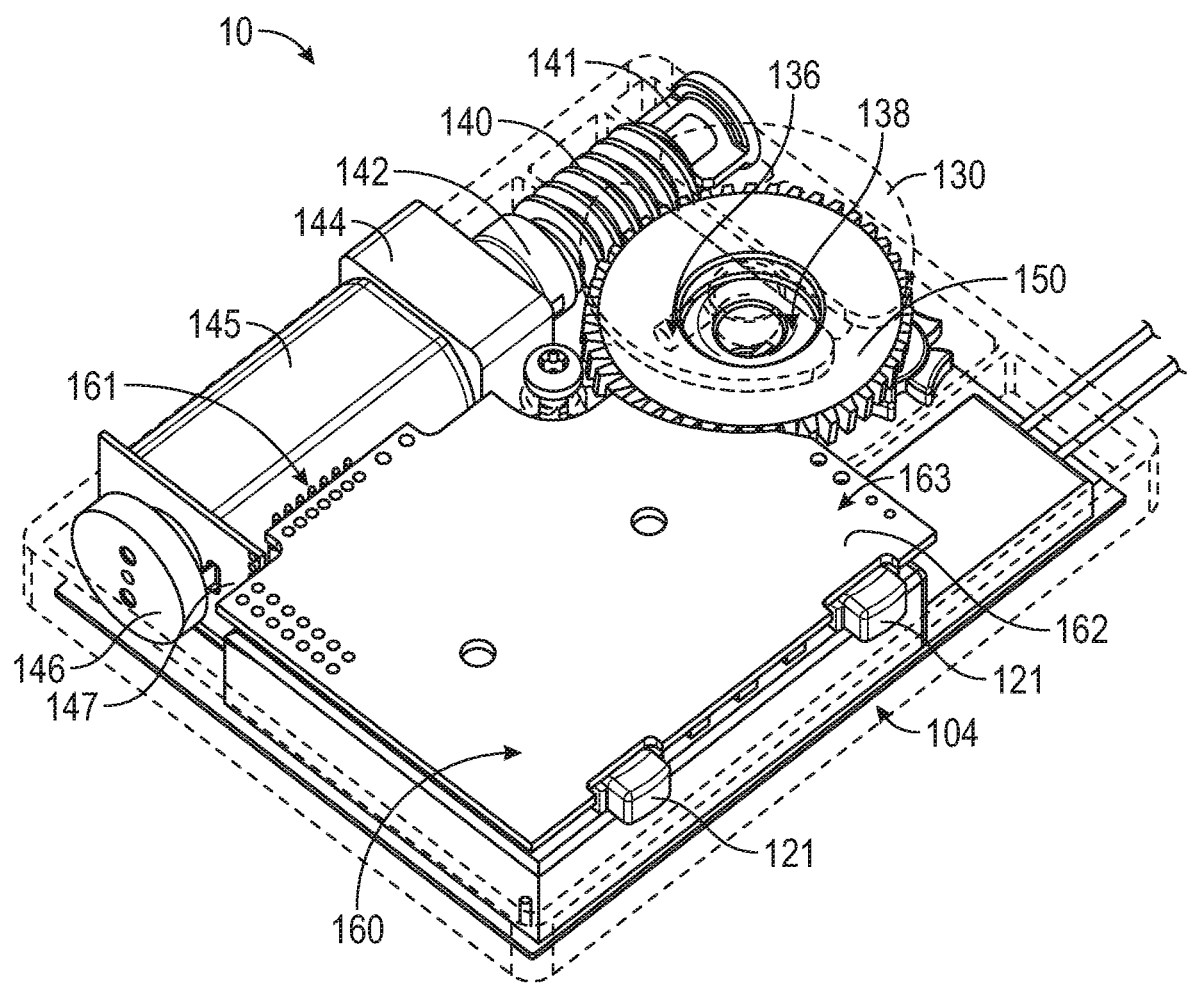
FIG. 2A is a perspective view of an example lacing engine, according to some example embodiments.
Figure 2B:
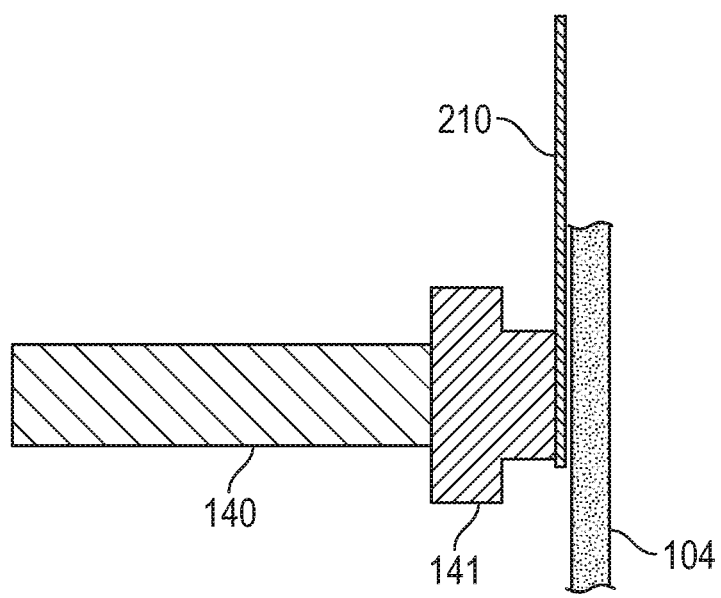
FIG. 2B is a box diagram illustrating a force measurement/detection apparatus for incorporation into a lacing engine, according to an example embodiment.

FIG. 2A is an illustration of various internal components of lacing engine 10, according to example embodiments. FIG. 2B illustrates how a load cell can be incorporated into a lacing engine, such as lacing engine 10. In this example, the lacing engine 10 further includes spool magnet 136, O-ring seal 138, worm drive 140, bushing 141, worm drive key 142, gear box 144, gear motor 145, motor encoder 146, motor circuit board 147, worm gear 150, circuit board 160, motor header 161, battery connection 162, and wired charging header 163. The spool magnet 136 assists in tracking movement of the spool 130 though detection by a magnetometer (not specifically illustrated in FIG. 2). The o-ring seal 138 functions to seal out dirt and moisture that could migrate into the lacing engine 10 around the spool shaft 133. In this example, the load cell can be incorporated outboard of bushing 141 to detect forces transmitted from the spool 130 through the worm gear 150 onto the worm drive 140. Information from the load cell can be used as an input to the tension control to tighten or loosen lace tension based on an inference on activity level being experienced by the footwear. For example, if the load cell is detecting frequent shock loading on the laces, it can be inferred that activity level of high (e.g., engaged in basketball game). Alternatively, if the load cell is detecting little or no shock loading, then the lacing engine can infer low activity level and potentially loosen the laces.

In this example, major drive components of the lacing engine 10 include worm drive 140, worm gear 150, gear motor 145 and gear box 144. The worm gear 150 is designed to inhibit back driving of worm drive 140 and gear motor 145, which means the major input forces coming in from the lacing cable via the spool 130 are resolved on the comparatively large worm gear and worm drive teeth. This arrangement protects the gear box 144 from needing to include gears of sufficient strength to withstand both the dynamic loading from active use of the footwear platform or tightening loading from tightening the lacing system. The worm drive 140 includes additional features to assist in protecting the more fragile portions of the drive system, such as the worm drive key 142. In this example, the worm drive key 142 is a radial slot in the motor end of the worm drive 140 that interfaces with a pin through the drive shaft coming out of the gear box 144. This arrangement prevents the worm drive 140 from imparting any axial forces on the gear box 144 or gear motor 145 by allowing the worm drive 140 to move freely in an axial direction (away from the gear box 144) transferring those axial loads onto bushing 141 and the housing structure 100. As noted above, the arrangement also allows for convenience placement of a load cell outboard of the bushing 141 to measure axial forces on the drive training from laces.

FIG. 2B includes a secondary illustration of an example load cell, such as load cell 210. In this example, the load cell 210 is depicted sandwiched between bushing 141 and housing 104 of the lacing engine 10. The housing 104, in this example, a vertical sidewall of a housing of the lacing engine 10. In a different example, the orientation of the drive train may cause the positioning of the load cell 210 to differ. In this example, the load cell 210 is in a position to measure loading of the drive train against the housing 104.

Alternative Lacing Engine Concepts

Figure 3A:
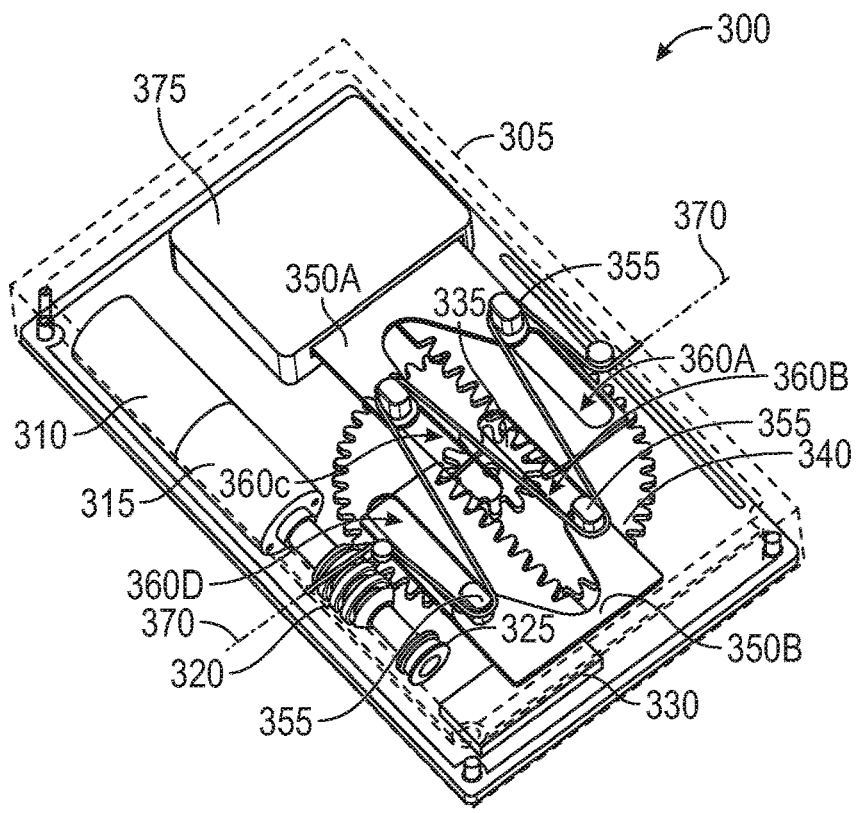
FIGS. 3A-3D are various illustrations of a double-yoke lacing engine configuration, according to some example embodiments.
Figure 3B:
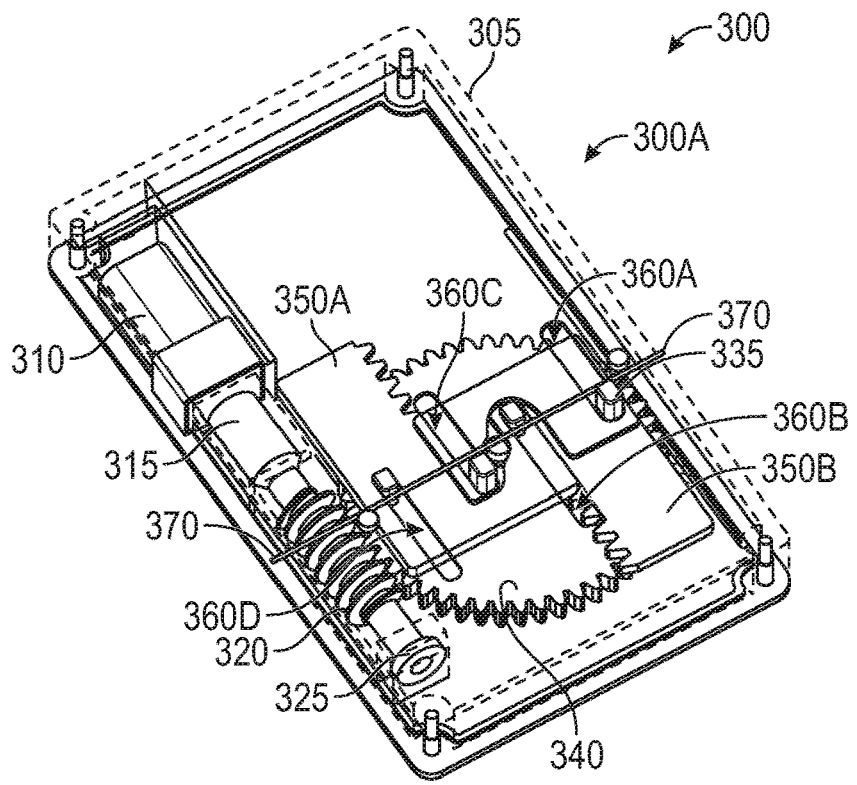

FIGS. 3A-3D are various illustrations of a double-yoke lacing engine configuration, according to some example embodiments. The lacing engine discussed in this example can be utilized within the footwear system 1 in place of the lacing engine 10 discussed above. The illustrated double-yoke lacing engine translates rotary motion through a worm drive to a rack and pinion arrangement that moves lace yokes in opposition directions to induce a W-shape into a lace running between the yokes. As shown in FIG. 3B, the double-yoke lacing engine in a loose position allows the continuous lace to run straight through, as tightening occurs, the yokes moving in opposite directions each grab the lace in alternating positions to tighten the overall lace loop (see FIG. 3C). Other example embodiments could incorporate additional lace engagement positions (e.g., lace guides 355) to increase the amount of lace travel induced by the lacing engine.

In this example, the double yoke lacing engine 300 can include structures such as a housing 305, a motor 310, a gearbox 315, a worm drive 320, a worm bearing 325, a controller circuit 330, a drive pinion 335, a worm gear 340, yokes 350A, 350B (collectively known as yokes 350), lace guides 355, lace guide channels 360A, 360B, 360C, 360D (collectively known as lace guide channels 360), lace cable 370 and a battery 375. The battery 375, motor 310, gearbox 315, and controller circuit 330 are structures supporting the basic operation of the lacing take-up mechanism embodied by the yokes 350. The battery 375 supplies the necessary power to run the motor 310 and controller circuit 330. The motor 310 supplies rotational input to the gearbox 315, which in turn provides higher torque rotational input to the worm drive 320. In this example, the gearbox 315 receives a higher rotations per minute (RPM) input and steps down the input RPMs to a lower RPM output better suited to operate the double yoke take-up mechanism via the worm drive 320.

The worm drive 320 mates to a large diameter worm gear 340 that further reduces operational RPM and also increases operational torque delivered to the drive pinion 335 mounted on a spindle extending from the center of the worm gear 340. The drive pinion 335 simultaneously engages gear racks on each of the yokes 350. Each yoke 350 is roughly U-shaped, with one leg of the U being longer and including a rack structure along the inner edge. Each of the yokes 350 also includes multiple lace guides, such as lace guides 355. In this example, each yoke includes two lace guides. However, other examples can include additional lace guides. More lace guides can result in an increase in the length of lace cable the mechanism can take-up.

Figure 3C:
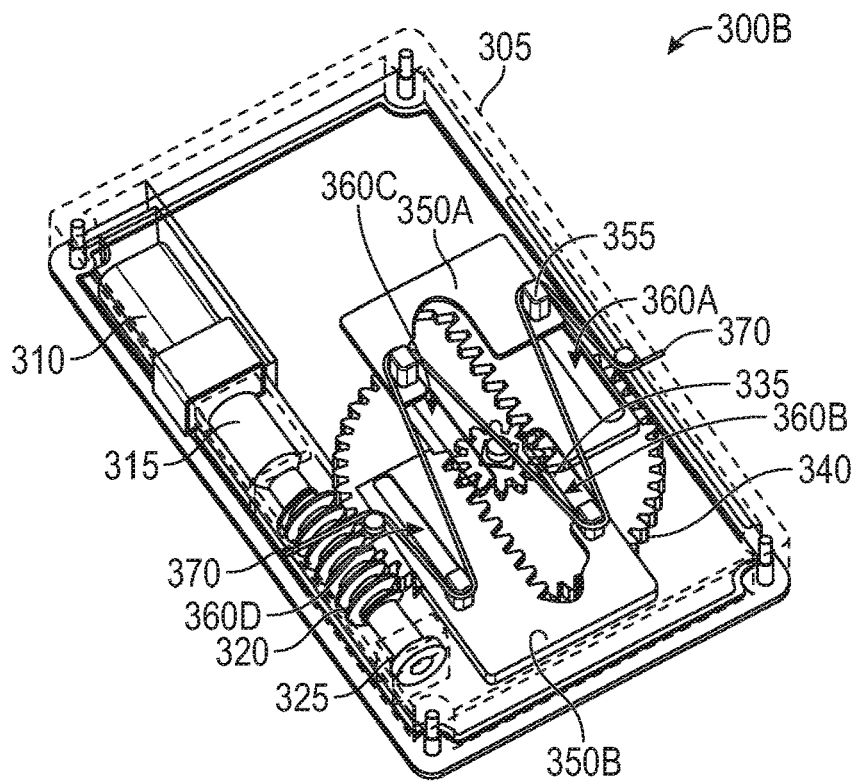

In this example, each of the lace guides 355 extends through a lace guide channel, such as lace guide channels 360. FIG. 3A illustrates the lace guides 355 at the end of travel along the lace guide channels 360, which represents the fully tightened lace cable position. FIG. 3B illustrates a fully closed or loose position where the lace guides are just touching, but not engaged with the lace cable 370. FIG. 3C illustrates a fully open or tightened position for the lacing engine, with the lace guides 355 transitioned to the opposite ends of the lace guide channels 360. In order to move between the open and closed positions illustrated in FIG. 3B and FIG. 3C, respectively, the worm drive 320 is rotated to cause rotation of the worm gear and the attached pinion drive 335. The pinion drive 335 then engages the rack portions of the yokes 350, which causes the yokes to translate away from each other when moving from a closed (loose) position to an open (tightened) position. Translation of the yokes 350 is restricted, at least in part, by the lace guides 355 extending through the lace guide channels 360. In this example, the lace guide channels 360 are cut-outs in a superior surface of the lacing engine with radiused or rounded ends that conform the shape of the lace guides 355. Additional guiding structures may also be included in the superior surface of the lacing engine housing 305.

Figure 3D:
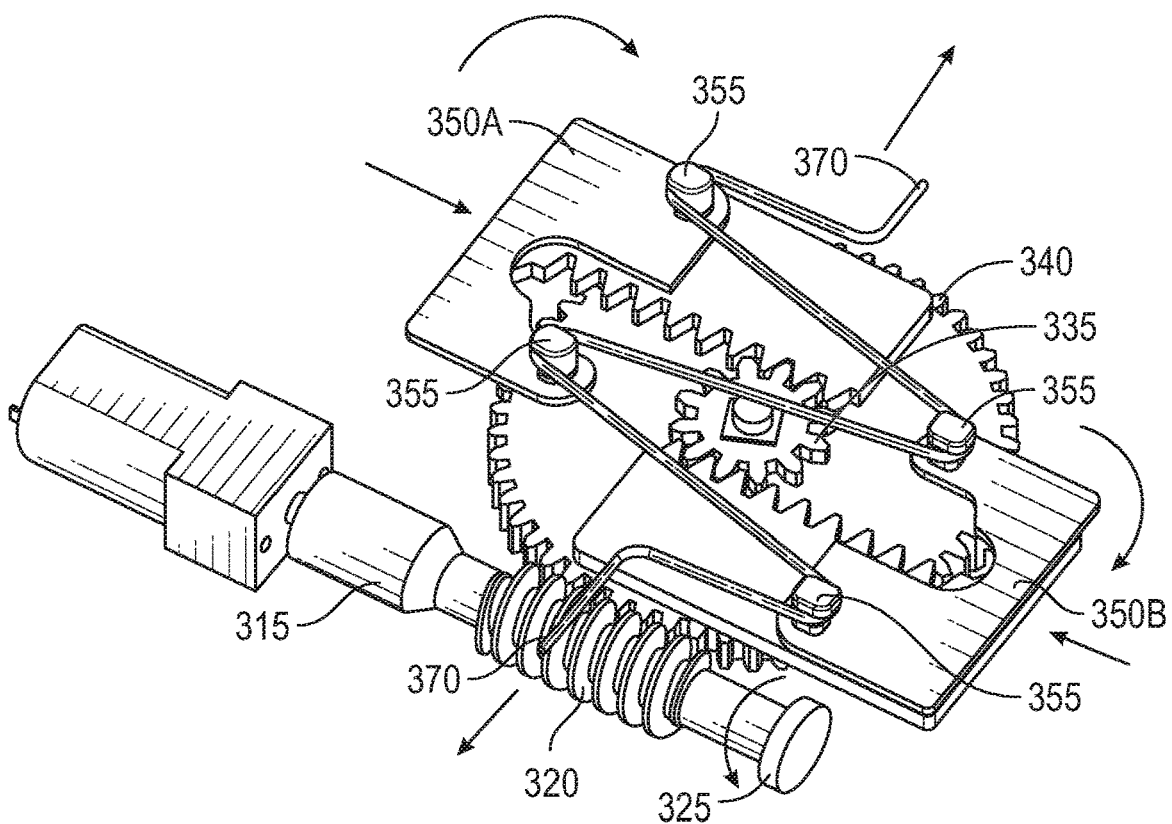

FIG. 3D illustrates the double yoke lace take-up mechanism without the lacing engine housing. In example also includes various illustrative arrows that indicate rotational and translational forces at work within the double yoke system. For example, rotation of the worm drive 320 translates into rotation of the worm gear 340 about an axis transverse ti to the longitudinal axis of the worm drive 320. Rotation of the worm gear 340 also results in rotation of the drive pinion 335. Rotation of the drive pinion 335 results in opposing translation of yoke 350A and yoke 350B. Translation of the yokes 350 results in the lace guides 355 engaging the lace cable 370 and translating the lace cable 370 along an axis transverse to the axis of translation of the yokes 350. For example, if the yokes 350 are oriented such that the yokes 350 translate in a proximal and distal direction (towards the heel and toe of a footwear platform), the lace cable translation occurs along a lateral-medial axis.

FIGS. 4A-4D are various illustrations of a radial pulley based lacing engine, according to some example embodiments. The illustrated radial pulley based lacing engine includes a worm gear driven outer disc with a static inner disc. The inner disc and outer disc each host a series of rotating spools that are used to take up the lace cable. In certain examples, the inner disc and outer disc can rotation separately to take up different portions of the lace cable. Alternative, as in this example, the inner disc can remain static while the outer disc rotates around it to take-up the lace cable. As illustrated in FIG. 5B, the lace cable runs straight through the middle of the inner disc and outer disc in the loose state. In a tighten state (see FIG. 4C), the inner disc and outer disc operate to engage lengths of the lace cable, in this example by the outer disc rotating around the inner disc.

In this example, the radial pully based lacing engine 400 can include structures such as a housing 405, a battery 410, a controller circuit 415, a motor 420, a worm drive 425, a worm gear 430, an outer disc 435, rotating spools 440, an inner disc 435, a lateral output spool 450, a medial output spool 455, and a lace cable 460 running through a lace channel 465. The motor 420 provides rotation input through a gearbox to the worm drive 425. The gearbox can provide some speed reduction and increase torque provided to the worm drive 425. In turn, the worm drive 425 provides rotational input to the worm gear 430. The large diameter of the worm gear 430 provide further speed reduction and also functions to increase torque transmitted to the outer disc 435. The rotating spools 440 dispersed around the outer disc 435 and the inner disc 445 engage the lace cable 460 as the outer disc 435 is rotated by the worm gear 430.

FIG. 4B and FIG. 4C illustrate the loose state and tightened state respectively. In this example, the outer disc 435 is rotated in a counter-dock wise direction to engage a middle section of a lace cable. The leading rotating spools, labeled 440A and 440B respectively in these figures, engage the lace cable as tightening is initiating. The leading rotating spools route the lace cable around inner rotating spools 440C and 440D as counter-clockwise rotation continues. In the fully tightened state, the lace cable is routed along at least a portion of each of the rotating spools 440 on both the outer disc 435 and the inner disc 445, as shown in FIG. 4C.

Figure 4A:
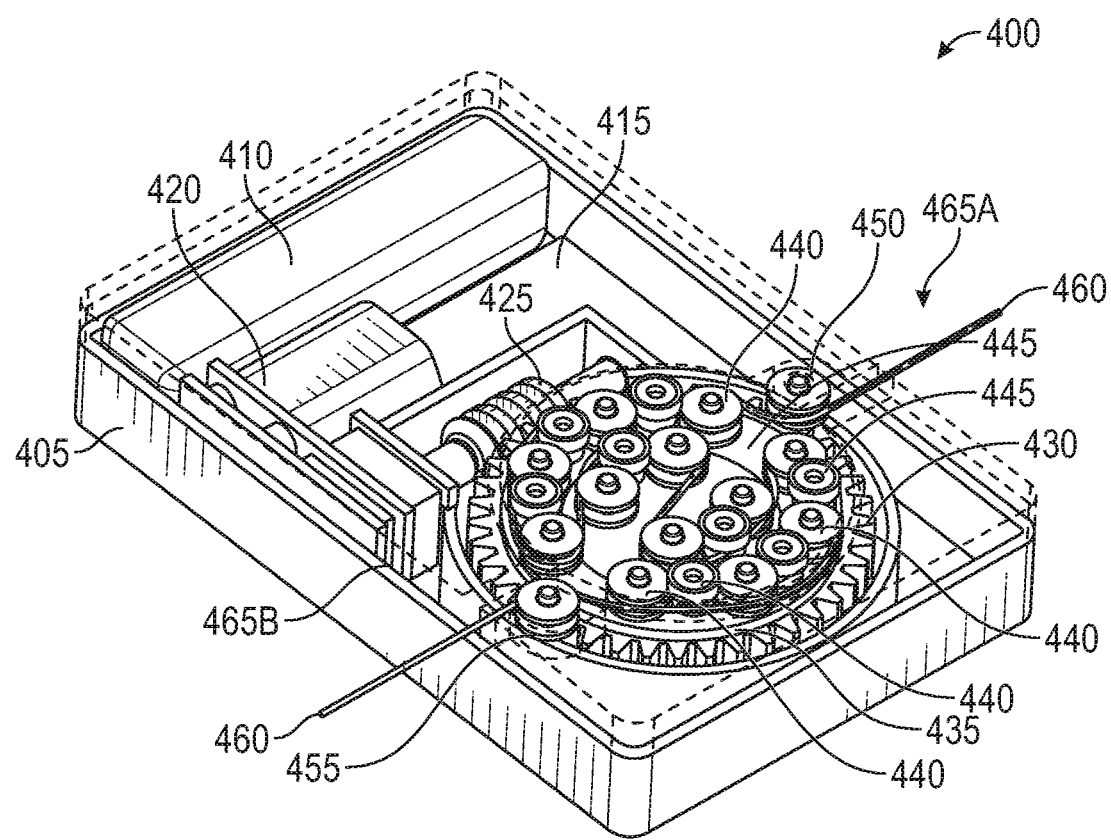
Figure 4D:
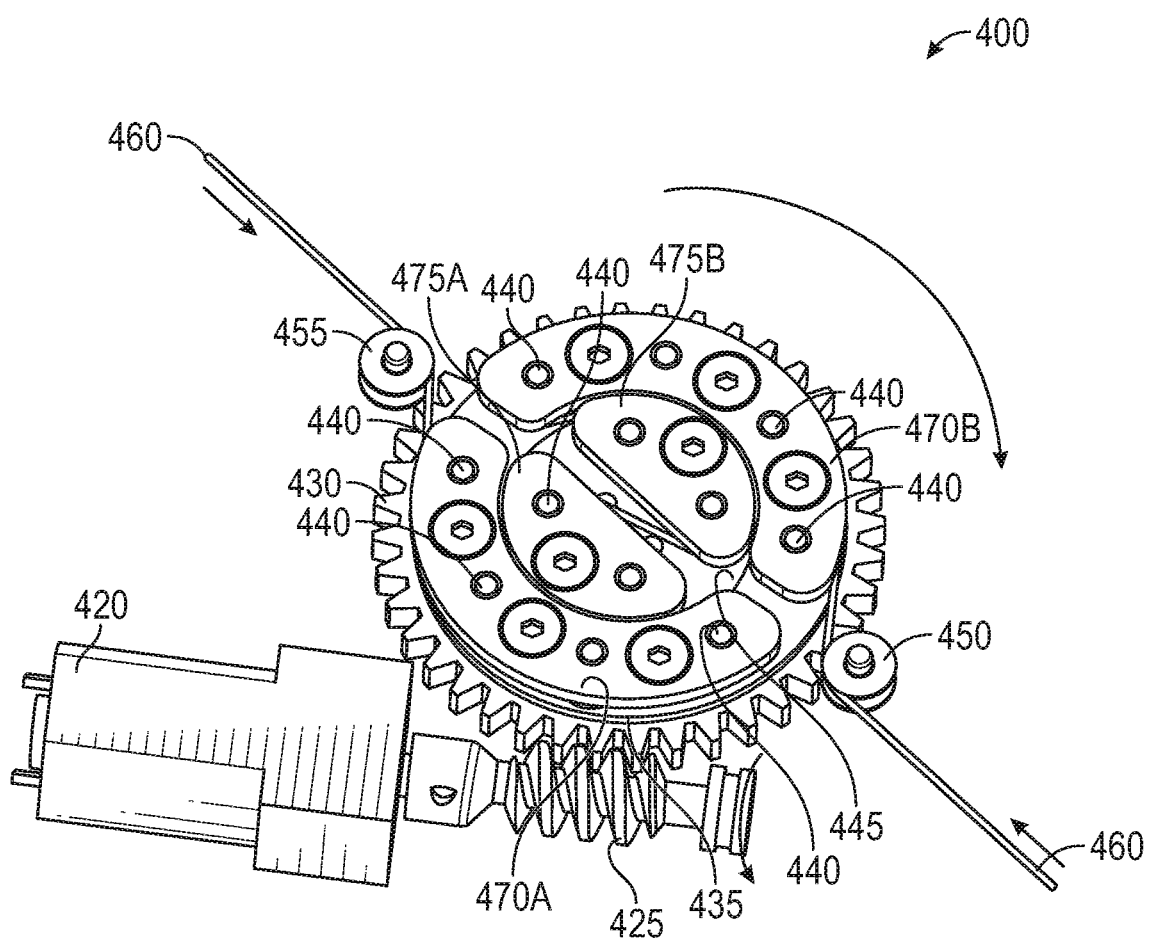
Figure 5B:
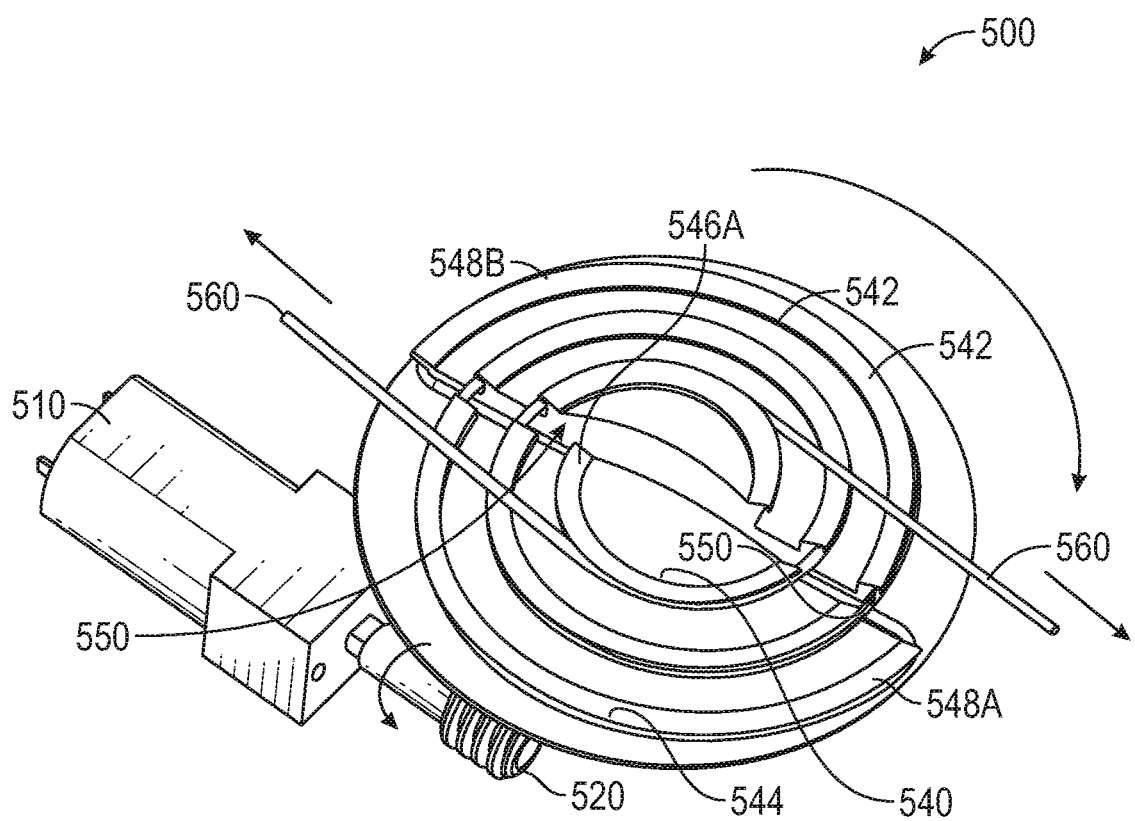

FIG. 4D illustrates the tightening mechanism from the radial pulley lacing engine 400 including various arrows indicating directions of torques and forces. As illustrated, the worm drive 425 rotates around a longitudinal axis running through the motor 420 and the length of the worm drive 425. The worm drive 425 transmits this rotational force (torque) to the worm gear 430 that rotates around an axis transverse to the longitudinal axis of the worm drive 425. The worm gear 430 rotates the outer disc 435, which results in the lace cable 460 linearly translating along an axis indicated by the outward pointing arrows. When the radial pulley lacing engine 400 is tightening the lace cable 460, a force opposite the outwardly facing arrows is imparted on the lace cable 460. The lace cable 460 in turn applied forces aligned with the outwardly facing arrows on the radial pulley lacing engine 400 while the footwear is worn by a user. These forces are transmitted and absorbed by the worm gear 430 and worm drive 425. In the current example, the worm drive 425 and worm gear 430 are configured to transmit the lace cable forces away from the motor 420, which reduces the opportunity for damage to this component.

FIG. 4D also includes illustration of outer and inner spool guards. In this example, the rotating spools 440 on the outer disc 435 are covered by outer spool guards 470A and 470B, which are split into medial and lateral sides to allow for creation of lace channel 465. The rotating spools 440 on the inner disc 445 are covered by inner spool guards 475A and 475B, which are also split to create the lace channel 465.

FIGS. 5A-5B includes various diagrams illustrating a variable spool based lacing engine, according to some example embodiments. The illustrated variable spool based lacing engine can include a motor and worm drive/gear driving a variable spool. The variable spool engages the lace loop across a series of cascading spool grooves. The variable spool is designed to have the loose lace run straight through a center groove, and as the lace cable is tightened, the lace runs through the series of cascading (stepped) grooves.

FIG. 5A illustrates a perspective view of the variable spool lacing engine 500. In this example, the variable spool lacing engine 500 can include structures such as a housing 505, a motor 510, a worm drive 520, a worm gear 530, a variable spool 540, a central lace channel 550 and a lace cable 560. In this example, the variable spool 540 includes structures such as a lateral lace groove 542, a medial lace groove 544, lace exits 546 and lace engagements 548.

In operation, the variable spool lacing engine 500 is positioned so the lace cable 560 runs through the central lace channel 550, which is positioned down the center of the variable spool 540. In the loose state, the lace cable 560 is not engaged by any of the variable spool 540 (as illustrated in FIG. 5A), FIG. 5B illustrates the variable spool lacing engine 500 take-up mechanism with the lace in an almost fully tightened state. In operation, the variable spool 540 is rotated by the worm drive 520 rotating the worm gear 530 on which the variable spool 540 is mounted. Upon initial rotation, the lace cable 560 is first engaged by the medial lace engagement 548A and the lateral lace engagement 548B, which respectively represent the start of the medial lace groove 542 and the lateral lace groove 544. As the variable spool 540 is rotated further, the lace cable 560 is wound onto the spiraling lace grooves until the lace cable reaches the lace exits 546A, 546B. The term spiral is used within this specification to describe the overall shape of the lace grooves within the variable spool 540 as the grooves progressively reduce in diameter. However, the spiral term is not intended to imply a certain shape, structure, or uniformity in how the grooves progress.

Figure 6A:
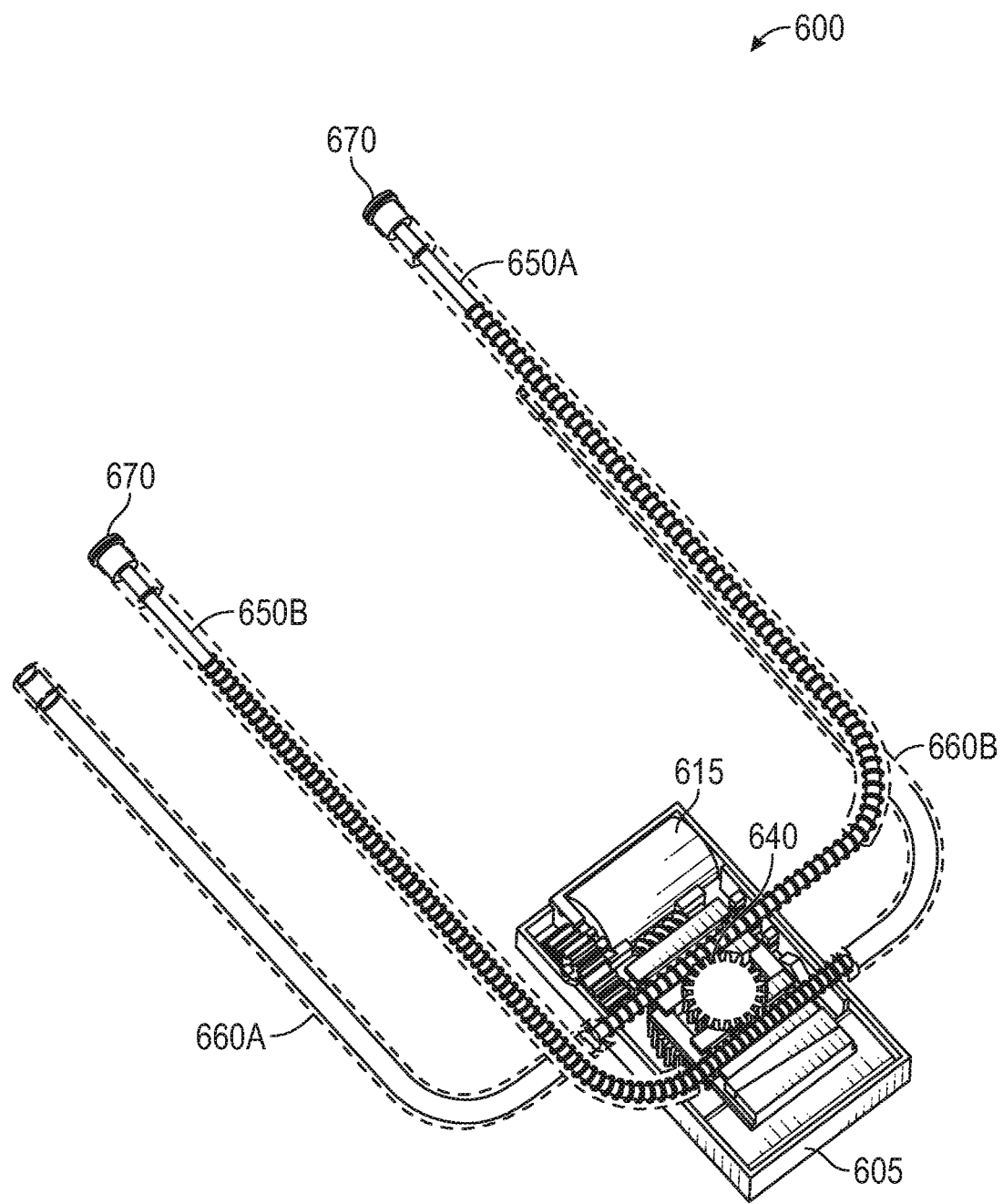
FIGS. 6A-6D are various illustrations of a zip strip based lacing engine, according to some example embodiments.
Figure 6B:
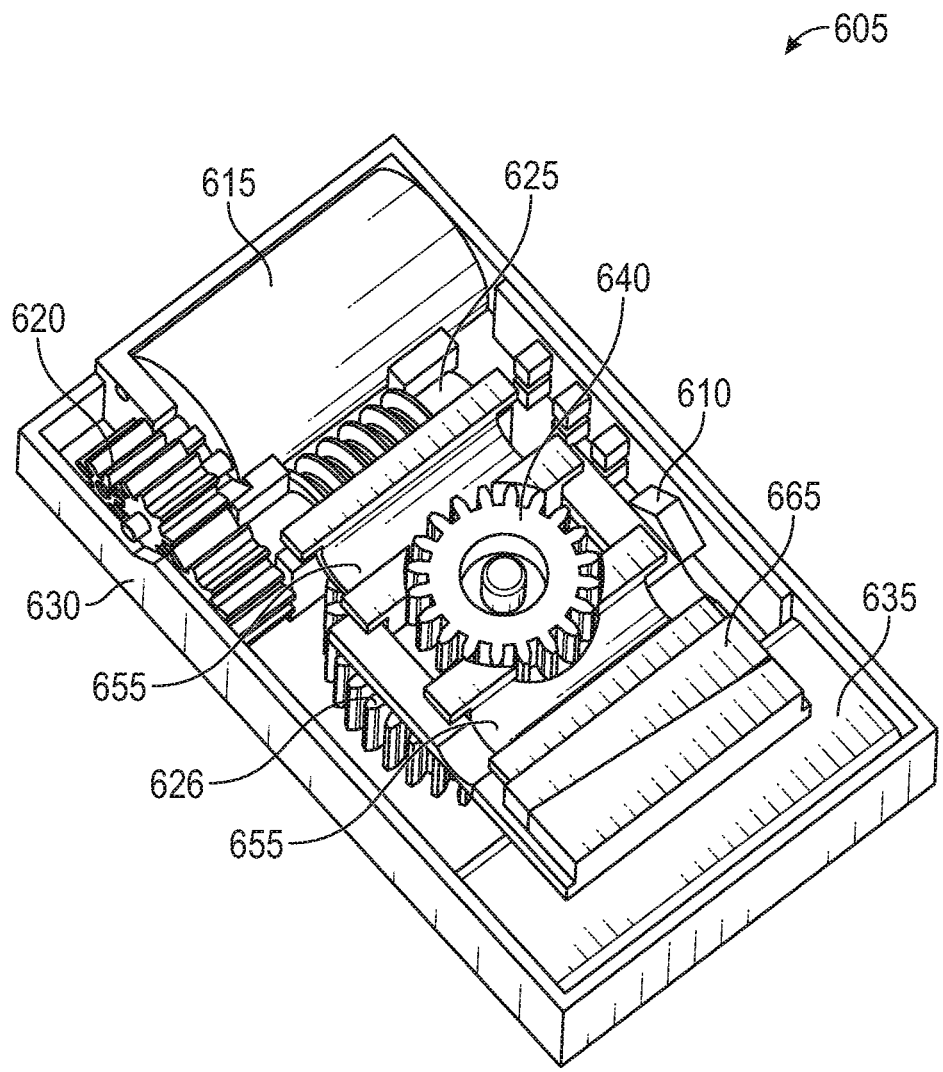

FIGS. 6A-6B are various illustrations of a zip strip based lacing engine, according to some example embodiments. The illustrated zip strip based lacing engine can include a pinion gear driven by a worm drive off a gearbox and motor combination. The pinion gear is positioned proximate to a pair of flexible rack guides that are used to guide the flexible rack (zip strip) through the lacing engine. The zip strips (flexible racks) are ti illustrated as running through the lacing engine and guided by tubes extending on either side of the lacing engine. In operation, a lace cable can be attached to the end of each flexible rack strip, which are then translated through operation of the strip drive pinion.

FIG. 6A illustrates a perspective view of a zip strip lacing engine 600. In this example, the zip strip lacing engine 600 can include structures such as a lacing engine module 605, a motor 615, a strip drive pinion 640, a proximal flexible rack strip 650A, a distal flexible rack strip 650B (collectively referenced as flexible rack strips 650), a proximal guide tube 660A, a distal guide tube 660B (collectively referenced as guide tubes 660), and lace bushings 670. The strip drive pinion 640 includes teeth spaced to engage the ribs on each of the flexible rack strips 650 as they pass through the lacing engine module 605.

FIG. 6B provides a more detailed perspective view of the lacing engine module 605. In this example, the lacing engine module 605 can include structures such as a controller circuit 610, a motor 615, a gearbox 620, a worm drive 625, a worm gear 626, a housing 630, a battery 635, a strip drive pinion 640, rack (strip) guides 655, quick release plunger 665. The flexible rack strips and guide tubes are not illustrated in FIG. 6B. In this example, the motor 615 provides rotational input to the gearbox 620. The output of from the gearbox 620 drives the worm drive 625. In this example, the gearbox 620 can be designed to reduce RPMs coming from the motor and increase the torque. The worm drive 625 engages the worm gear 626, which in turn rotates the strip drive pinion 640 attached to a common spindle. The large diameter of the worm gear 626 also functions to decrease RPMs and increase torque delivered to the strip drive pinion 640.

The strip drive pinion 640 includes a diameter designed to intrude into the rack guides 655, which allows the teeth of the strip drive pinion 640 to engage the ribs on the flexible rack strips 650. The quick release plunger 665 articulates linearly transverse to a longitudinal axis of the lacing engine (running proximally to distally) to shift the flexible rack strips 650 away from engagement with the teeth of the strip drive pinion 640. In operation, the quick release plunger 665 shifts the rack guides 655 in opposing directions away from the strip drive pinion 640. In an example, the quick release plunger 665 is used to quickly release tension on the flexible rack strips 650 and subsequently on the lace cable attached to the ends of the flexible rack strips 650. Overall operation of the zip strip lacing engine is controlled via the controller circuit 610, which includes a member device to retain executable instructions to control operations.

Figure 6C:
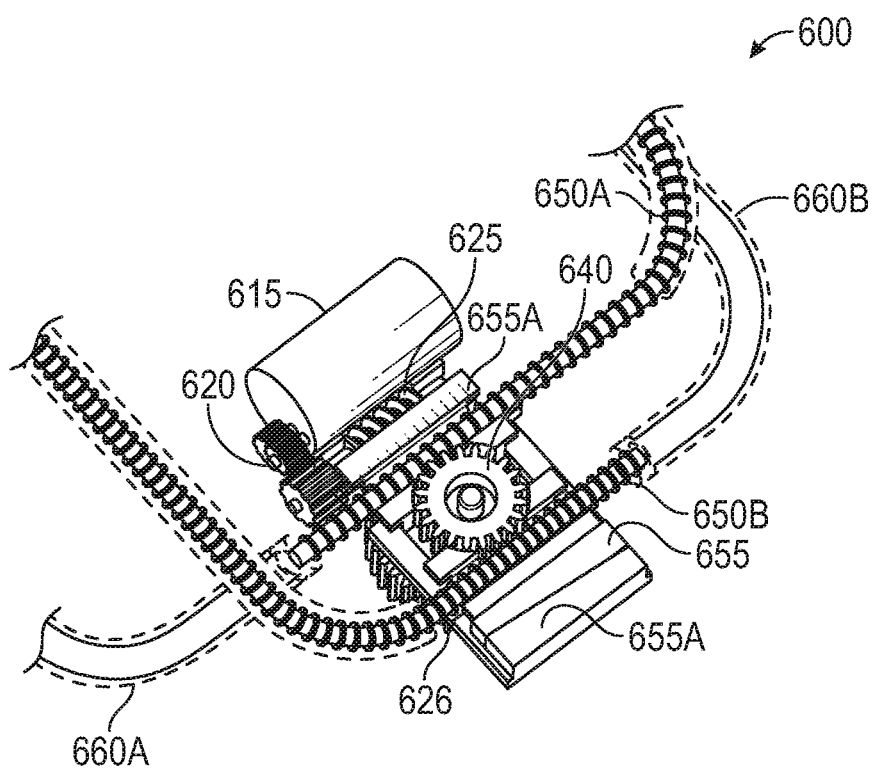

FIG. 6C is a perspective view of a portion of the zip strip based lacing engine 600. In this example, the flexible rack strips 650 are illustrated in engagement with the strip drive pinion 640. Flexible rack strip 650A is illustrated as engaging the strip drive pinion 640 along a proximal side, with tightening engagement occurring when the flexible rack strip 650A is moved right-to-left (counter-clockwise rotation of the strip drive pinion 640). Flexible rack strip 650B is illustrated in engagement with the distal side of the strip drive pinion 640, and tightening engagement occurring with left-to-right movement in response to counter-clockwise rotation of the strip drive pinion 640. In this example, the flexible rack strip 650A moves within guide tube 660A and flexible rack strip 650B moves within guide tube 660B.

In the example illustrated in FIG. 6C, flexible rack strip 650A runs through rack guide 655A and flexible rack strip 650B runs through rack guide 655B. In order to enable the quick release plunger 665 to operate on both rack guide 655A and rack guide 655B, rack guide 655A includes additional extension that runs under and around the strip drive pinion 640. While not specifically illustrated in this example, the rack guide 655A and rack guide 655B can be biased away from each other by a spring or similar structure.

Figure 6D:
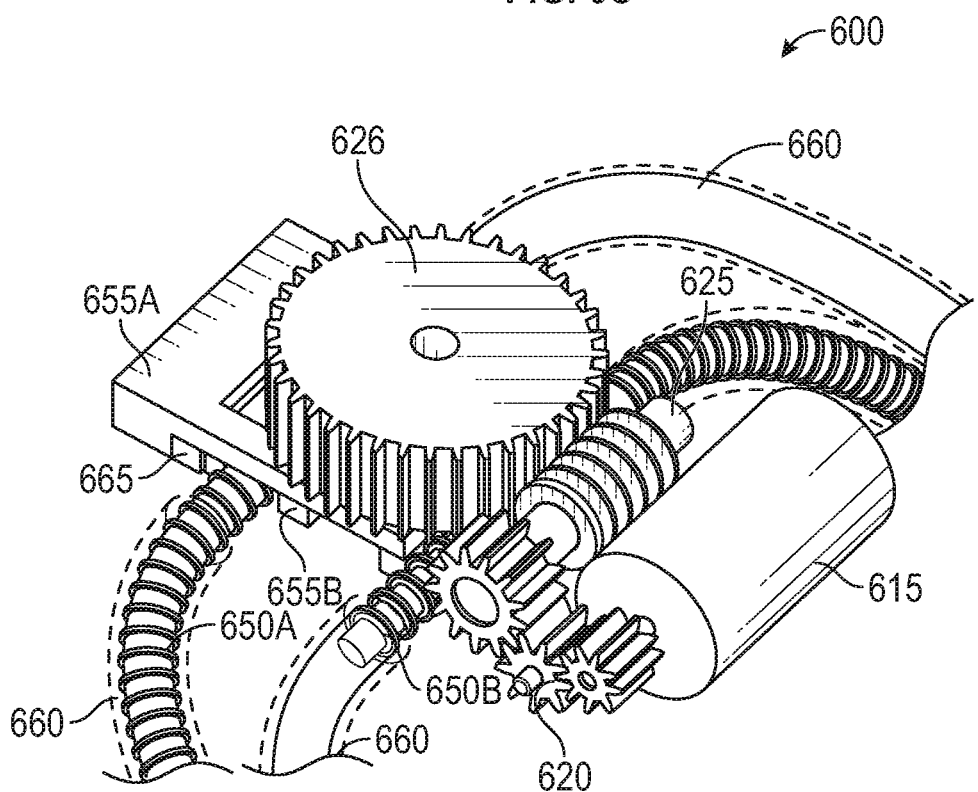

FIG. 6D is a perspective view of an inferior side of a portion of the zip strip lacing engine 600. In this example, the worm gear 626 is shown in engagement with the worm drive 625. The worm drive to worm gear arrangement provide good speed reduction ratio and is self-locking as the worm gear will not back-drive the worm drive. Accordingly, lace tension is controllable and will not loosen without engaging the motor or use of a clutch mechanism in arbor transmitting torque to the strip drive pinion 640. This example also illustrates the structure of the rack guide 655A. As shown, the rack guide 655A includes an extension that engages the quick release plunger on the far side of rack guide 655B.

EXAMPLES

Example 1 describes subject matter including a lacing engine apparatus for an automated footwear platform. In this example, the lacing engine apparatus can include components such as a housing, a drivetrain, a first yoke, and a second yoke. The housing can receive a portion of a lace cable for tightening the footwear platform. The drivetrain can be disposed within the housing. The drivetrain can include a motor to deliver rotational input to a series of reduction gears and a pinion gear. The first yoke can include a first linear array of gear teeth engaging a first side of the pinion gear and a first lace guide to engage the lace cable in a first location upon translation of the first yoke. The first linear array of gear teeth can enable the first yoke to translate in a first direction in response to rotation of the pinion gear.

The second yoke can include a second linear array of gear teeth engaging a second side of the pinion gear and a second lace guide to engage the lace cable in a second location upon translation of the second yoke. The second linear array of gear teeth can enable the second yoke to translate in a second direction in response to rotation of the pinion gear.

In Example 2, the subject matter of Example 1 can optionally include applying tension on the lace cable through translation of the first yoke in the first direction and translation of the second yoke in the second direction, the tension increases as the first lace guide and the second lace guide move in opposing directions and pull more of the lace cable into the housing.

In Example 3, the subject matter of any one of Examples 1 and 2 can optionally include a first lace guide channel disposed through a superior surface of the housing to guide translation of the first lace guide, and a second lace guide channel disposed through the superior surface of the housing to guide translation of the second lace guide.

In Example 4, the subject matter of Example 3 can optionally include the first lace guide channel being spaced apart from the second lace guide channel along a medial-lateral axis on the superior surface of the housing.

In Example 5, the subject matter of Example 4 can optionally include the first lace guide channel partially overlapping the second lace guide channel along a proximal-distal axis.

In Example 6, the subject matter of any one of Examples 3 to 5 can optionally include the first yoke and the second yoke translating between a first state and a second state. In the first state the first lace guide and the second lace guide do not engage the lace cable and are located at proximate ends of the first lace guide channel and the second lace guide channel, respectively. In the second state the first lace guide and the second lace guide fully engage the lace cable and are located at distant ends of the first lace guide channel and the second lace guide channel, respectively.

In Example 7, the subject matter of any one of Examples 1 to 6 can optionally include the drivetrain having a worm drive engaging a worm gear.

In Example 8, the subject matter of Example 7 can optionally include the pinion gear rotating on a common axis with the worm gear.

Example 9 describes subject matter including a lacing engine apparatus for an automated footwear platform. The lacing engine apparatus can include components such as a housing, a drivetrain, and a lace take-up mechanism. The housing can include a lace channel for receiving a portion of a lace cable. The drivetrain can be disposed within the housing and include a motor to deliver rotational input to a worm drive. The lace take-up mechanism is adapted to accumulate a length of lace cable upon activation. The lace take-up mechanism can include an outer rotating disc and an inner stationary disc. The outer rotating disc can include a first plurality of rotating spools distributed on a superior surface in a first group on a first side and a second group on a second side. The first plurality of rotating spools can be adapted to engage the lace cable extending through the lace channel upon rotation of the outer rotating disc. The inner stationary disc can include a second plurality of rotating spools distributed on a superior surface of the inner stationary disc in a third group and a fourth group. The second plurality of rotating spools can be adapted to engage the lace cable upon rotation of the outer rotating disc.

In Example 10, the subject matter of Example 9 can optionally include the inner stationary disc being disposed within the outer rotating disc.

In Example 11, the subject matter of any one of Examples 9 and 10 can optionally include each of the first group and the second group of the first plurality of rotating spools can be disposed around a common diameter within the outer rotating disc, the common diameter is less than the major diameter of the outer rotating disc.

In Example 12, the subject matter of Example 11 can optionally include locations of rotating spools in the first group on the first side mirroring locations of the rotating spools in the second group on the second side.

In Example 13, the subject matter of any one of Examples 9 to 12 can optionally include the plurality of rotating spools being distributed on the outer rotating disc in positions that sequentially engage the lace cable upon rotation of the outer rotating disc.

In Example 14, the subject matter of Example 13 can optionally include a rotating spool in the first group engaging the lace cable at the same time as a corresponding rotating spool in the second group upon rotation of the outer rotating disc.

In Example 15, the subject matter of any one of Examples 9 to 14 can optionally include the housing having a lateral output spool and a medial output spool to guide the lace cable into and out of the lace take-up mechanism.

In Example 16, the subject matter of any one of Examples 9 to 15 can optionally include the worm drive engaging a worm gear and the outer rotating disc coupled to a superior surface of the worm gear.

Example 17 describes subject matter including a lacing engine apparatus for an automated footwear platform. In this example, the lacing engine apparatus can include a housing, a drivetrain, and a lace take-up mechanism. The housing can include a lace channel for receiving a portion of a lace cable. The drivetrain can be disposed within the housing and include a motor delivering rotational input to a worm drive. The lace take-up mechanism for accumulating a length of lace cable upon activation can include a variable lace spool. The variable lace spool can include spiral lace groove divided into a lateral lace groove and a medial lace groove by a central lace channel running across a major diameter of the variable lace spool. The central lace channel can be adapted to receive the lace cable. Upon rotation of the variable lace spool, the lace cable is progressively received along increasing lengths of the lateral lace groove and the medial lace groove.

In Example 18, the subject matter of Example 17 can optionally include the lace entering the spiral lace groove, upon rotation of the variable lace spool, at a medial ti lace engagement point and a lateral lace engagement point.

In Example 19, the subject matter of Example 18 can optionally include, upon continued rotation of the variable lace spool, the lace cable continuing to accumulate along both the lateral lace groove and the medial lace groove.

In Example 20, the subject matter of Example 19 can optionally include, after each 180 degrees of rotation, the lace cable crossing over the central lace channel in transitioning from the medial lace groove to the lateral lace groove and from the lateral lace groove to the medial lace groove as the lace cable continues to accumulate on the spiral lace groove.

In Example 21, the subject matter of any one of Examples 17 to 20 can optionally include the drivetrain further having a worm gear disposed on an inferior surface of the variable lace spool and positioned to receive rotational input from the worm drive.

Example 22 describes subject matter including a lacing engine apparatus for an automated footwear platform. In this example, the lacing engine apparatus can include a housing, a drivetrain, and a lace take-up mechanism. The drivetrain can be disposed within the housing and include a motor delivering rotational input through a gearbox to a worm drive. The lace take-up mechanism for retracting a length of lace cable upon activation can include a first flexible rack strip and a second flexible rack strip. The first flexible rack strip can be disposed within a first guide tube and engage a portion of the drivetrain. A first end of the lace cable can be coupled to a first end of the first flexible rack strip. The second flexible rack strip can be disposed within a second guide tube and engage the portion of the drivetrain. A second end of the lace cable can be coupled to a first end of the second flexible rack strip. The first flexible rack strip can linearly translate within the first guide tube in a first direction and the second flexible rack strip can linearly translate within the second guide tube in a second direction in response to activation of the drivetrain.

In Example 25, the subject matter of Example 22 can optionally include the drivetrain having a strip drive pinion that engages the first flexible rack strip and the second flexible rack strip.

In Example 24, the subject matter of Example 23 can optionally include rotation of the strip drive pinion linearly translating the first flexible rack strip in the first direction and linearly translating the second flexible rack strip in the second direction.

In Example 25, the subject matter of Example 24 can optionally include the first direction being opposite the second direction with respect to a medial-lateral axis running through the strip drive pinion.

In Example 26, the subject matter of any one of Examples 22 to 25 can optionally include the first direction is opposite the second direction with respect to a medial-lateral axis running through the strip drive pinion.

In Example 27, the subject matter of Example 26 can optionally include the first rack guide being disposed parallel to a medial-lateral axis of the housing on a first side of the strip drive pinion, and the second rack guide being disposed parallel to the medial-lateral axis on a second side of the strip drive pinion.

In Example 28, the subject matter of any one of Examples 26 and 27 can optionally include the lace take-up mechanism having a quick release plunger adapted to linearly translate the first rack guide and the second rack guide away from the strip drive pinion. In some examples, the quick release plunger causes the first rack guide and the second rack guide to translate in opposite directions.

ADDITIONAL NOTES

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The disclosure, therefore, is not to be taken in a limiting sense, and the scope of various embodiments includes the full range of equivalents to which the disclosed subject matter is entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include ti elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. An Abstract, if provided, is included to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention includes:

1. A lacing engine apparatus for an automated footwear platform, the apparatus comprising:
    a housing receiving a portion of a lace cable;
    a drivetrain disposed within the housing, the drivetrain including a motor to deliver rotational input to a series of reduction gears and a pinion gear;
    a first yoke including a first linear array of gear teeth engaging a first side of the pinion gear and a first lace guide to engage the lace cable in a first location upon translation of the first yoke, the first linear array of gear teeth enabling the first yoke to translate in a first direction in response to rotation of the pinion gear; and
    a second yoke including a second linear array of gear teeth engaging a second side of the pinion gear and a second lace guide to engage the lace cable in a second location upon translation of the second yoke, the second linear array of gear teeth enabling the second yoke to translate in a second direction in response to rotation of the pinion gear.

2. The lacing engine apparatus of claim 1, wherein translation of the first yoke in the first direction and translation of the second yoke in the second direction applies tension on the lace cable as the first lace guide and the second lace guide move in opposing directions and pull more of the lace cable into the housing.

3. The lacing engine apparatus of claim 1, wherein the housing includes:
    a first lace guide channel disposed through a superior surface of the housing to guide translation of the first lace guide; and
    a second lace guide channel disposed through the superior surface of the housing to guide translation of the second lace guide.

4. The lacing engine apparatus of claim 3, wherein the first lace guide channel and the second lace guide channel are spaced apart along a medial-lateral axis on the superior surface of the housing.

5. The lacing engine apparatus of claim 4, wherein the first lace guide channel and the second lace guide channel partially overlap along a proximal-distal axis.

6. The lacing engine apparatus of claim 3, wherein the first yoke and the second yoke translate between a first state and a second state, wherein in the first state the first lace guide and the second lace guide do not engage the lace cable and are located at proximate ends of the first lace guide channel and the second lace guide channel, respectively, and wherein in the second state the first lace guide and the second lace guide fully engage the lace cable and are located at distant ends of the first lace guide channel and the second lace guide channel, respectively.

7. The lacing engine apparatus of claim 1, wherein the drivetrain includes a worm drive engaging a worm gear.

8. The lacing engine apparatus of claim 7, wherein the pinion gear rotates on a common axis with the worm gear.

9. A footwear assembly comprising:
    a footwear upper portion;
    a footwear lower portion affixed to the footwear upper portion and including an interior recess;
    a lacing engine disposable within the interior recess and configured to adjust a lace cable routed into the interior recess from the footwear upper portion, the lacing engine comprising:
        a housing receiving a portion of the lace cable;
        a drivetrain disposed within the housing, the drivetrain including a motor to deliver rotational input to a series of reduction gears and a pinion gear;
        a first yoke including a first linear array of gear teeth engaging a first side of the pinion gear and a first lace guide to engage the lace cable in a first location upon translation of the first yoke, the first linear array of gear teeth enabling the first yoke to translate in a first direction in response to rotation of the pinion gear; and
        a second yoke including a second linear array of gear teeth engaging a second side of the pinion gear and a second lace guide to engage the lace cable in a second location upon translation of the second yoke, the second linear array of gear teeth enabling the second yoke to translate in a second direction in response to rotation of the pinion gear.

10. The footwear assembly of claim 9, wherein translation of the first yoke in the first direction and translation of the second yoke in the second direction applies tension on the lace cable as the first lace guide and the second lace guide move in opposing directions and pull more of the lace cable into the housing.

11. The footwear assembly of claim 9, wherein the housing includes:
    a first lace guide channel disposed through a superior surface of the housing to guide translation of the first lace guide; and
    a second lace guide channel disposed through the superior surface of the housing to guide translation of the second lace guide.

12. The footwear assembly of claim 11, wherein the first lace guide channel and the second lace guide channel are spaced apart along a medial-lateral axis on the superior surface of the housing.

13. The footwear assembly of claim 12, wherein the first lace guide channel and the second lace guide channel partially overlap along a proximal-distal axis.

14. The footwear assembly of claim 11, wherein the first yoke and the second yoke translate between a first state and a second state, wherein in the first state the first lace guide and the second lace guide do not engage the lace cable and are located at proximate ends of the first lace guide channel and the second lace guide channel, respectively, and wherein in the second state the first lace guide and the second lace guide fully engage the lace cable and are located at distant ends of the first lace guide channel and the second lace guide channel, respectively.

15. The footwear assembly of claim 9, wherein the drivetrain includes a worm drive engaging a worm gear.

16. The footwear assembly of claim 15, wherein the pinion gear rotates on a common axis with the worm gear.

* * * * *